United States Patent [19]

Allen et al.

[11] 4,171,399
[45] Oct. 16, 1979

[54] MAGNETIC RECORDING AND STORAGE DEVICE HAVING HIGH ABRASION RESISTANCE AND METHOD

[75] Inventors: Richard E. Allen, Corning; Peter R. Segatto, Elmira, both of N.Y.

[73] Assignee: Corning Glass Works, Corning, N.Y.

[21] Appl. No.: 858,567

[22] Filed: Dec. 8, 1977

Related U.S. Application Data

[63] Continuation of Ser. No. 383,889, Jul. 30, 1973, which is a continuation of Ser. No. 177,313, Sep. 2, 1971, abandoned.

[51] Int. Cl.$^2$ ............................................. H01F 10/00
[52] U.S. Cl. ..................................... 428/336; 427/131; 427/132; 428/447; 428/457; 428/523; 428/539; 428/900

[58] Field of Search ................................ 427/127–132, 427/48; 428/900, 336, 500, 539, 447, 461, 463, 523, 457

[56] References Cited

U.S. PATENT DOCUMENTS

| 3,466,156 | 9/1969 | Peters et al. | 427/131 |
| 3,795,542 | 3/1974 | Halaby et al. | 427/314 |

*Primary Examiner*—Bernard D. Pianalto
*Attorney, Agent, or Firm*—Walter S. Zebrowski; Clarence R. Patty, Jr.

[57] ABSTRACT

A magnetic recording and storage device having high wear resistance is produced by providing a magnetic recording and storage device having a film of solid magnetic material which has been bonded to a surface of a rigid substrate. A thin film of a lubricating compound is then applied to the film of magnetic material.

12 Claims, 2 Drawing Figures

MAGNETIC RECORDING AND STORAGE DEVICE HAVING HIGH ABRASION RESISTANCE AND METHOD

CROSS-REFERENCE TO RELATED APPLICATION

This is a continuation of application Ser. No. 383,889 filed July 30, 1973 which was a continuation of application Ser. No. 177,313 filed Sept. 2, 1971, said application Ser. No. 177,313 having been abandoned.

BACKGROUND OF THE INVENTION

I. Field of the Invention

This invention relates to thin film magnetic recording and storage devices having high abrasion and wear resistance and a method of producing such devices. Since only slight damage to a magnetic film will likely result in improper recording of the information desired to be stored, abrasion and wear resistance is a desired quality of magnetic recording and storage devices. For example, in recording apparatus, using magnetic recording and storage disks as the storage device, even though the read and write head of such apparatus does not normally contact the disk during actual operation, the head does impact with the disk and bounce several times when the disk first begins to spin up to its operating speed, which is normally between 2400 rpm and 3600 rpm. These impacts can be highly damaging to the brittle solid magnetic material now being used on certain types of magnetic disks.

II. Prior Art

In conventional magnetic recording and storage devices the magnetic layer or film is comprised or particles such as, for example, particles of magnetite ($Fe_3O_4$) or gammic ferric oxide ($\gamma$-$Fe_2O_3$) which are bonded to each other and to the substrate by such bonding and filler materials as vinyl, urethane, epoxy or the like. Such a combination layer of binder and magnetic particles is somewhat flexible and is not significantly affected by abrasion or impacts received from the read and write head. However, improved magnetic recording and storage devices having higher coercivity, lighter weight and thinner magnetic layers or films are now being economically produced. These devices have a thin solid magnetic film which is chemically bonded to the substrate such that no bonding or filler material is required. Experiments indicate that the magnetic recording properties of these solid film devices are superior to conventional devices. However, the solid magnetic film chemically bonded to the substrate is somewhat brittle and cannot readily withstand repeated impact and abrasion. Therefore, it has become desirable to find some means of increasing the abrasion and wear resistance of these films.

SUMMARY OF THE INVENTION

It is, therefore, an object of this invention to provide a magnetic recording and storage device having a solid magnetic film which is highly resistant to abrasion and wear, and a simple and economical method of producing such a device.

Briefly, according to this invention, a magnetic recording and storage device having a solid magnetic film chemically bonded to a substrate is provided. A film of lubricating compound is applied to the exposed surface of the magnetic film.

Additional features and advantages of the present invention will become apparent to those skilled in the art from the following detailed description and attached drawings.

DESCRIPTION OF THE PREFERRED EMBODIMENT

Figure 1:
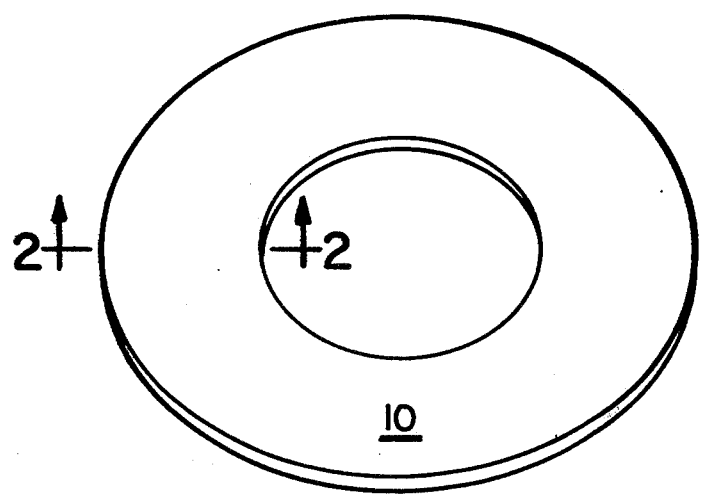
FIG. 1 shows an oblique view of a solid film magnetic recording and storage disk produced in accordance with the teachings of the invention.
Figure 2:
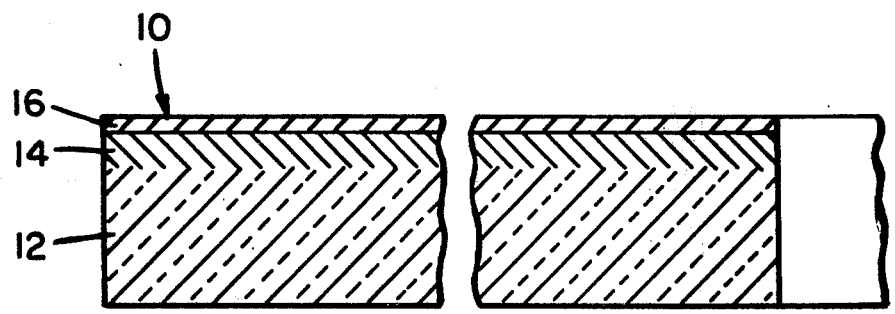
FIG. 2 shows a broken cross-sectional view taken along lines 2—2 of FIG. 1.

Referring now to FIG. 1 there is shown a magnetic recording and storage device 10. In the cross-sectional view of FIG. 2 the magnetic recording and storage device is shown having a suitable substrate 12, on a broad surface of which has been chemically bonded a magnetic film 14 which consists substantially of a material especially suitable for use with this invention, such as magnetite ($Fe_3O_4$), gamma ferric oxide ($\gamma$-$Fe_2O_3$), cobalt in combination with magnetite or cobalt in combination with gamma ferric oxide. Other suitable magnetic film materials include but are not limited to magnetite, or gamma ferric oxide in combination with one or more of the following metals: nickel, copper, zinc or manganese. A lubricating film 16 covers the exposed surface of the magnetic film 14. The thickness of the magnetic film and lubricating film as shown in FIG. 2 have been greatly enlarged with respect to the substrate thickness to better illustrate the invention. In addition, portions of the device shown in FIG. 2 have been broken away so that the drawings can be accomodated on a single sheet.

Magnetic recording and storage devices particularly benefited by this invention are those having solid, that is, non-particulate chemically bonded magnetic films. Such films are different from the conventional magnetic films presently used on most magnetic recording and storage devices. For example, conventional magnetic films are comprised of particles of magnetic material such as magnetite or gamma ferric oxide bonded to each other and to the substrate by a bonding and filler material such as vinyl, urethane, epoxy or the like. Magnetic recording and storage devices having a solid magnetic film chemically bonded to a substrate, may be produced by methods including but not limited to those described in the two U.S. Pat. Nos. 3,795,542 and 3,892,888 each entitled "Method of Making a Magnetic Recording and Storage Device" by James A. Murphy, Sami A. Halaby and Neal S. Kenny.

The lubricating film is preferably an organic compound including but not limited to a silicone based chlorosilane, polyethylene, or a stearate such as polyoxyethylene monostearate, morpholino stearate, triethanolamine stearate and mixtures of such materials. Silicone based chlorosilane compound contains a hydrocarbon radical having between 4 and 18 carbon atoms and an amino group to make the compound soluble in water, and such compound is herein referred to as a silicone based chlorosilane. The polyethylene is preferably an emulsified polyethylene having a molecular weight less than about 4000 and preferably between about 2000 and 3000. The stearates are preferably waxy solids which are soluble in water.

A particularly suitable lubricating compound is an emulsion of polyethylene and polyoxyethylene monostearate. Preferably the ratio of the constituents in the emulsion is between about 1 and 2.5 parts by weight of polyethylene for each part of polyoxyethylene monostearate.

In addition to the principal constituents of the lubricating compounds as set forth above, other constituents may be included therein provided they do not deleteriously affect the lubricating properties and characteristics of the compound. For example, a coloring agent may be included, or a dispersing and emulsifying agent may be employed to facilitate mixing of the lubricating compound. In addition, it may be desirable to incorporate stabilizers, bactericides, mold inhibitors or other similar materials into the compound.

The lubricating compound may be applied to the magnetic film by any convenient method including but not limited to painting, swabbing, silk screening, dipping or spraying. If the lubricant is applied by such methods as dipping or spraying, it is preferably to dilute the compound to the proper consistency with water. For such methods of application, the lubricating composition is preferably an aqueous composition containing less than about 2%, and still more preferably containing between about 0.01% and 1%, by weight of the organic material. The lubricant may be used without dilution if applied by painting, swabbing or silk screening.

The film of lubricating compound may be applied to the magnetic film in almost any desired thickness so long as the magnetic properties are not adversely affected. However, for most applications, a thickness of less than about 5000 Å is preferable. If the lubricating compound is applied in excess of 5000 Å, the excess may be removed by polishing, scraping or the like.

It should also be noted that the thickness of the lubricating film on a device may vary widely without adverse effect. For example, the lubricating film on a single device might vary from a few hundred angstroms to several thousand angstroms without adverse effect.

The lubricant may satisfactorily be applied to the magnetic film at any temperature up to the decomposition point of the lubricating compound, the temperature at which deterioration of the magnetic properties of the magnetic film occur, or the temperature at which deterioration of the physical properties of the substrate occurs, whichever is less. Experimental results indicate, however, that although excellent results are obtained when the lubricant is applied at any temperature not destructive to the lubricant or magnetic film, somewhat better results may be obtained if the lubricant is applied to the magnetic film at a temperature of about 80° C.

A commercially available polyethylene base lubricating compound satisfactory for use with this invention is AP-4 made by Ball Brothers Company, Inc. A commercially available silicone based chlorosilane compound satisfactory for use with the method of the invention is Z-4141 made by Dow Corning Corp.

EXAMPLE I

A magnetic recording and storage disk produced by the method described in Example IV of the aforementioned U.S. Pat. No. 3,892,888 is provided. The magnetic disk is heated to approximately 80° C., and a coating of full strength Ball Brothers AP-4 polyethylene based lubricant is painted onto the surface of the magnetic film. The disk and lubricant combination is then allowed to cool. After cooling, any excess lubricant is removed from the surface of the magnetic film by polishing said surface with a soft cloth such that a film of less than 5000 A remains on the surface of said magnetic film.

EXAMPLE II

A magnetic recording and storage disk of the type described in Example I is provided. The disk is heated to a temperature of approximately 80° C. and a coating of full strength Dow Corning Z-4141 silicone based chlorosilane lubricant is silk-screened onto the surface of the magnetic film. The disk and lubricant combination is then allowed to cool. After cooling, any excess lubricant is removed from the surface of the magnetic film by polishing said surface with a soft cloth such that a film of less than 5000 Å remains.

EXAMPLE III

A magnetic recording and storage disk of the type described in Example I is provided. The disk is heated to a temperature of approximately 80° C. after which it is sprayed with a 0.1% aqueous solution of polyoxyethylene monostearate. The magnetic disk and polyoxyethylene monostearate combination is then allowed to cool. After cooling any excess lubricating solution is removed by polishing the surface of said magnetic disk with a soft cloth such that a film of less than 5000 Å remains on the surface of said magnetic film.

EXAMPLE IV

The magnetic disk of the type described in Example I is provided. The disk is heated to a temperature of approximately 80° C. and is then sprayed with an aqueous emulsion of about 0.05% polyethylene having a molecular weight of about 2500, and 0.025% polyoxyethylene monostearate containing about 40 moles of polyoxyethylene per mole stearate.

The magnetic disk and lubricant combination is then allowed to cool to room temperature. After cooling, any excess lubricant is removed by polishing with a soft cloth such that a film of less than 5000 Å remains on the surface of said magnetic film.

Although the present invention has been discussed with respect to specific examples, it is not intended that such specific examples be limitations upon the scope of the invention except insofar as is set forth in the following claims.

We claim:

1. A magnetic recording and storage device having high abrasion and wear resistance comprising
   a substrate,
   a solid magnetic film chemically bonded to a surface of said substrate, and
   a lubricating film disposed directly on the surface of said magnetic film, said lubricating film being material selected from the group consisting of a silicone based chlorosilane, polyethylene, polyoxyethylene monostearate, morpholino stearate, triethanolamine stearate, and mixtures thereof.

2. The magnetic recording and storage device of claim 1 wherein said solid magnetic film is a material selected from the group consisting of magnetite, gamma ferric oxide, cobalt in combination with magnetite, cobalt in combination with gamma ferric oxide, nickel in combination with magnetite, nickel in combination with gamma ferric oxide, copper in combination with magnetite, copper in combination with gamma ferric oxide, zinc in combination with magnetite, zinc in combination with gamma ferric oxide, manganese in combination with magnetite, and manganese in combination with gamma ferric oxide.

3. The magnetic recording and storage device of claim 1 wherein said lubricating film has a thickness of less than 5000 A.

4. The magnetic recording and storage device of claim 1 wherein said lubricating film contains constituents selected from the group consisting of coloring agents, dispersion agents, emulsifying agents, stabilizers, bactericides, mold inhibitors and combinations thereof.

5. The magnetic recording and storage device of claim 1 wherein said magnetic film is a material selected from the group consisting of magnetite, gamma ferric oxide, cobalt in combination with magnetite, and cobalt in combination with gamma ferric oxide.

6. The magnetic recording and storage device of claim 1 wherein said lubricating film is polyoxyethylene monostearate.

7. The magnetic recording and storage device of claim 1 wherein said lubricant film is a mixture of polyethylene and polyoxyethylene monostearate.

8. The magnetic recording and storage device of claim 7 wherein said film of lubricating compound has a thickness of less than 5000 A.

9. The magnetic recording and storage device of claim 7 wherein said film of lubricating compound is a mixture of polyethylene and polyoxyethylene monostearate, said mixture consisting of between about 1 and 2.5 parts by weight of polyethylene for each part of polyoxyethylene monostearate.

10. A method for producing an abrasion and wear resistant magnetic recording and storage device comprising the steps of
providing a magnetic recording and storage device having a solid magnetic film chemically bonded to a substrate, and
applying a lubricating film directly to the surface of said magnetic film, said lubricating film being material selected from the group consisting of a silicone based chlorosilane, polyethylene, polyoxyethylene monostearate, morpholino stearate, triethanolamine stearate, and mixtures thereof.

11. The method of claim 10 wherein said solid magnetic film is a material selected from the group consisting of magnetite, gamma ferric oxide, cobalt in combination with magnetite, cobalt in combination with gamma ferric oxide, nickel in combination with magnetite, nickel in combination with gamma ferric oxide, copper in combination with magnetite, copper in combination with gamma ferric oxide, zinc in combination with magnetite, zinc in combination with gamma ferric oxide, manganese in combination with magnetite, manganese in combination with gamma ferric oxide, and combinations thereof.

12. The method of claim 10 further comprising the step of combining with said lubricating material a constituent selected from the group consisting of coloring agents, dispersion agents, emulsifying agents, stabilizers, bacetericides, mold inhibitors and combinations thereof prior to applying said lubricating film.

* * * * *